Oct. 18, 1932.    L. E. KOCH    1,883,246
ELECTRICAL SWITCH AND CONTROL CIRCUIT THEREFOR
Filed April 5, 1928    5 Sheets-Sheet 1
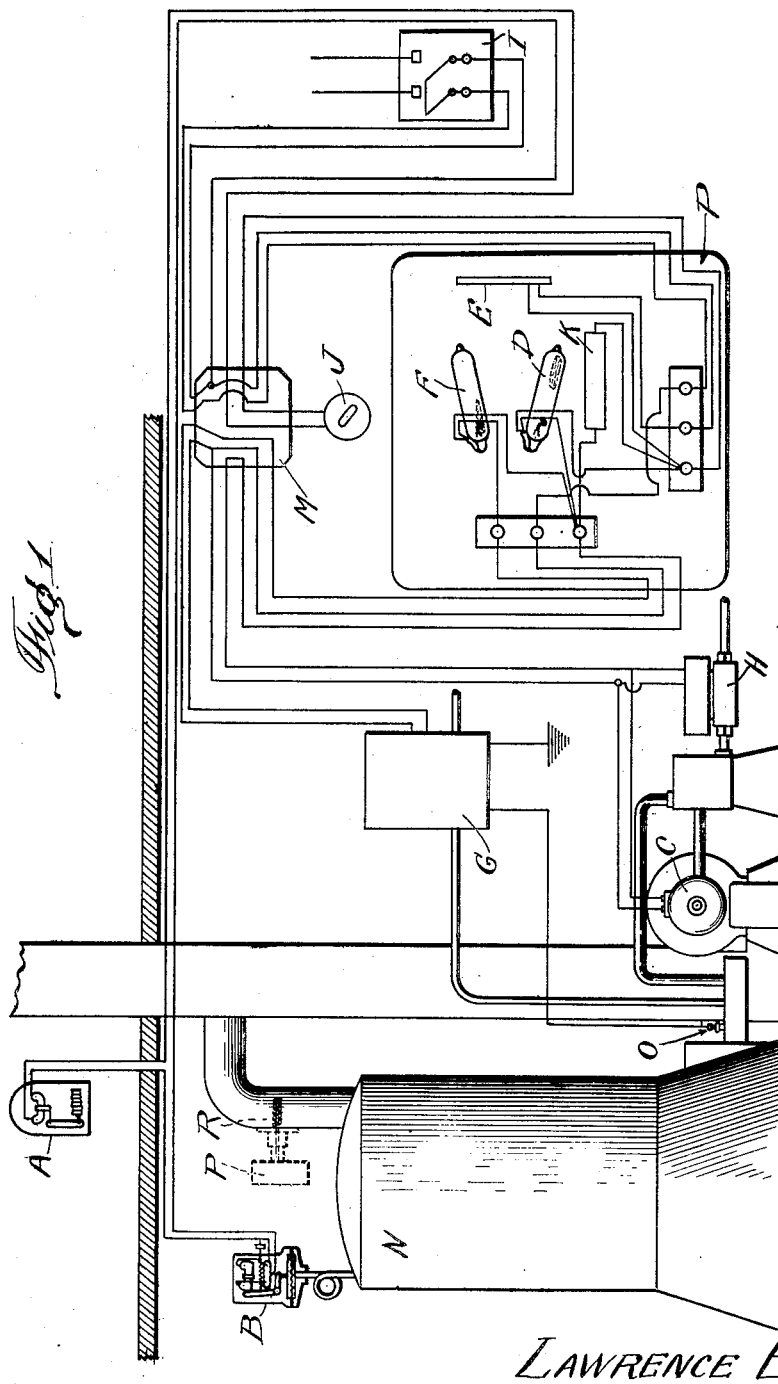
Inventor:
LAWRENCE E. KOCH Oct. 18, 1932.    L. E. KOCH    1,883,246
ELECTRICAL SWITCH AND CONTROL CIRCUIT THEREFOR
Filed April 5, 1928    5 Sheets-Sheet 2
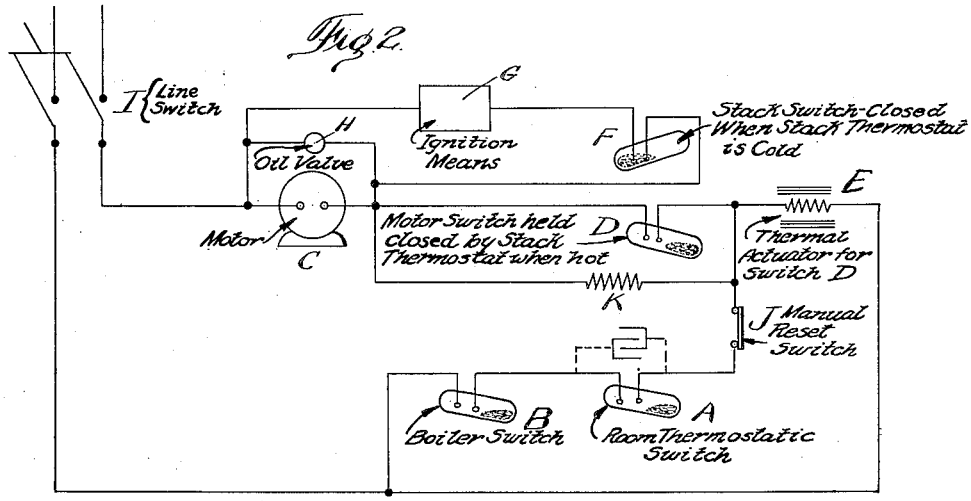
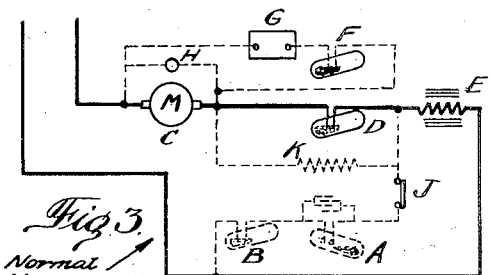
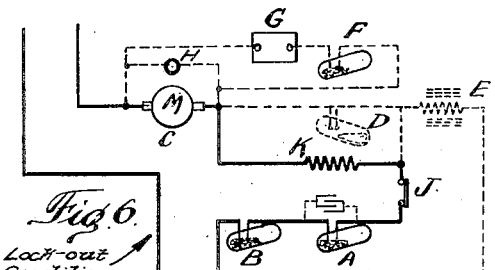
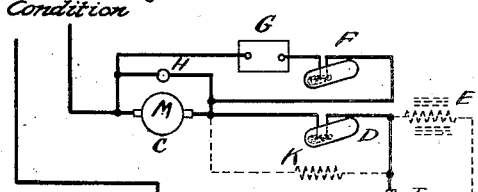
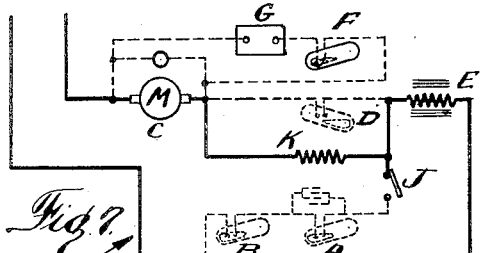
Inventor
LAWRENCE E. KOCH.

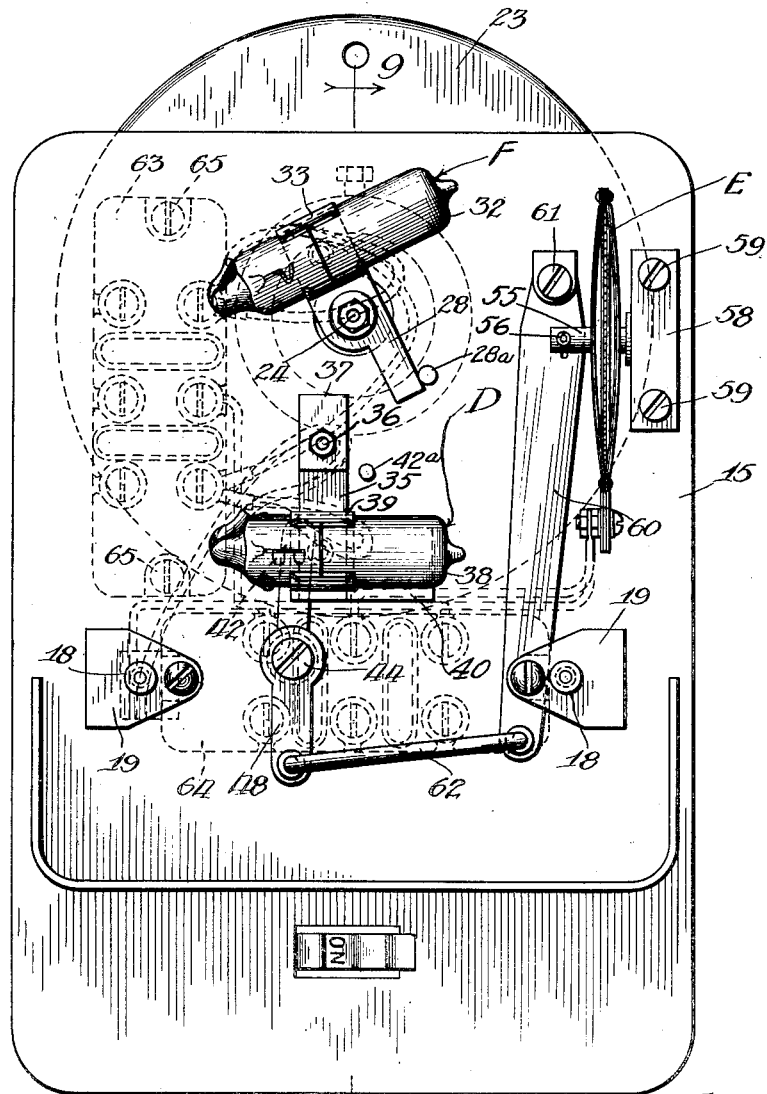

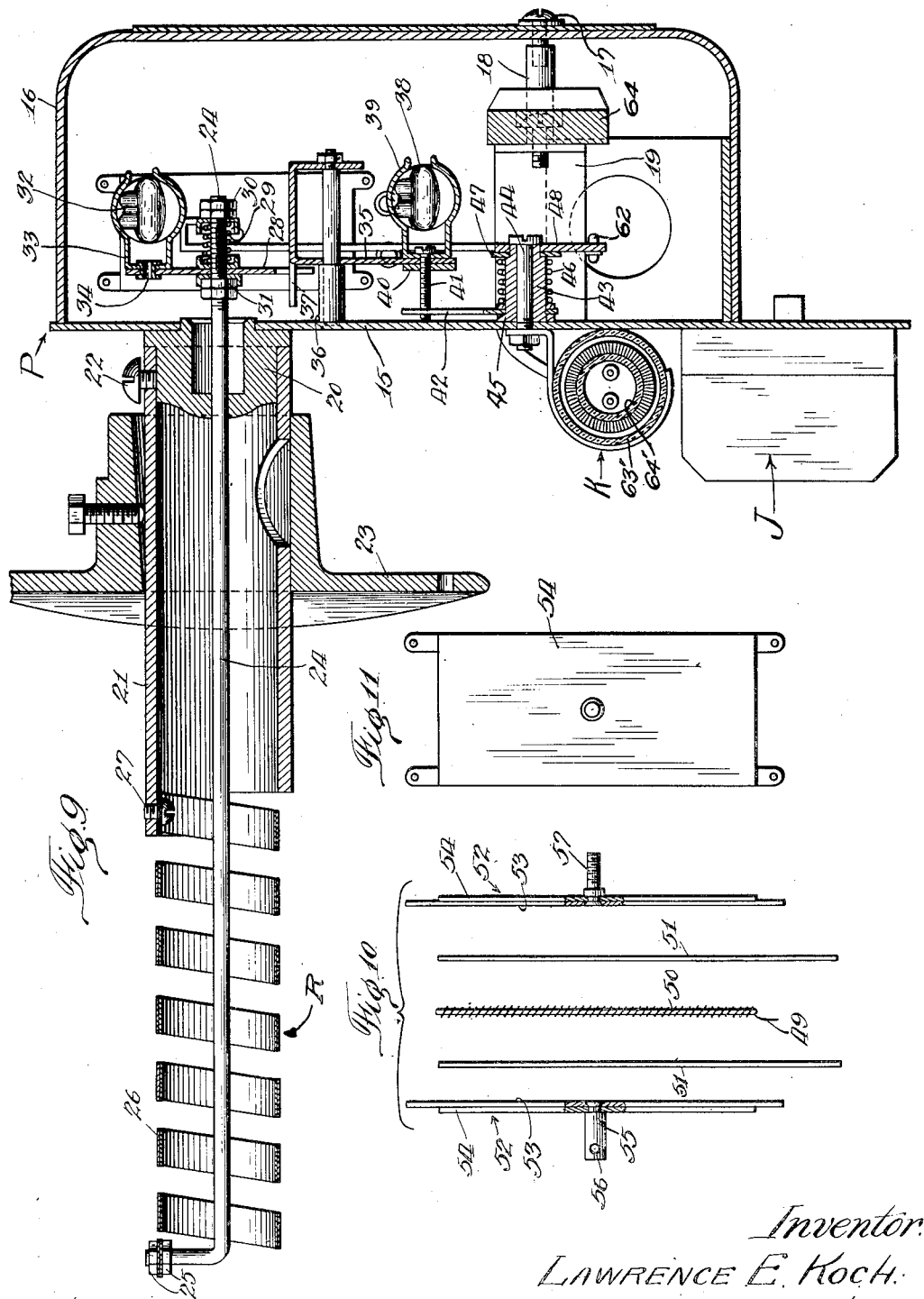

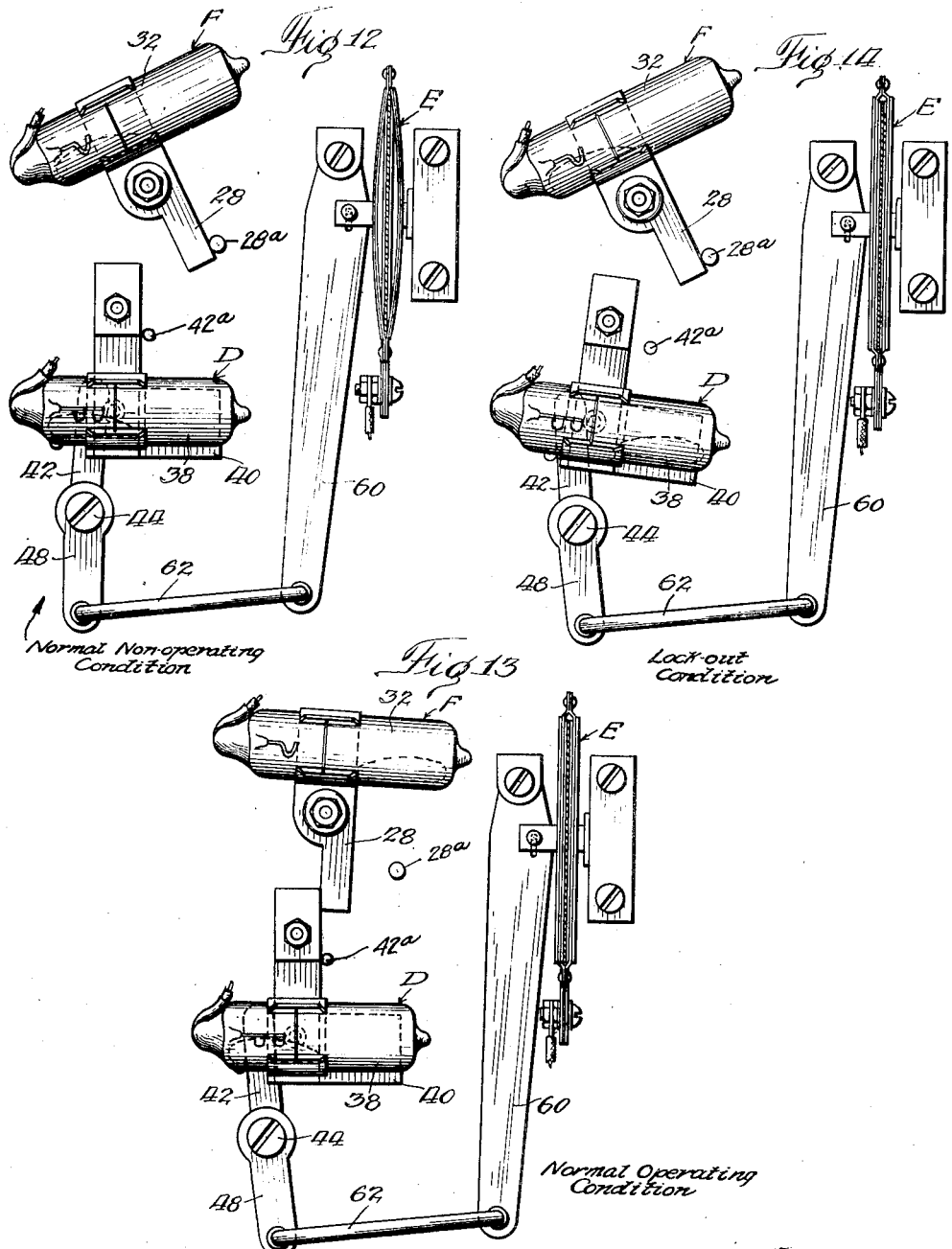

Patented Oct. 18, 1932

1,883,246

UNITED STATES PATENT OFFICE

LAWRENCE E. KOCH, OF ELKHART, INDIANA, ASSIGNOR, BY MESNE ASSIGNMENTS, TO MINNEAPOLIS-HONEYWELL REGULATOR COMPANY, OF MINNEAPOLIS, MINNESOTA, A CORPORATION OF DELAWARE

ELECTRICAL SWITCH AND CONTROL CIRCUIT THEREFOR

Application filed April 5, 1928. Serial No. 267,523.

This invention relates to an electrical switch and a control circuit therefor and has special reference to a safety control switch and to an electrical control circuit embodying a group of interconnected electrical devices, one of which latter devices is the present safety control switch.

More particularly, this invention relates to an electrical switch comprising a pair of coordinated thermally actuated members for operating switching means, the latter being preferably of the tiltable liquid contactor type. Although coordinated, the thermally operated members of the device are independently operable to actuate the switching means, one of said members being actuated by the heat obtained from a resistance coil connected in the control circuit and the other of said members being actuated by an external source of heat; that is, any heat obtained from a source outside of the control circuit.

The device of this invention is particularly adapted for use in an automatic heating system wherein numerous electrical devices are connected in an electrical circuit for the normal control of this system, the present device acting as a safety control to terminate the operation of the system in the event of the failure of the electrical devices previously mentioned to sustain desirable conditions of combustion.

Some of the devices connected in a control system, such as has been recited, may comprise a room thermostat which controls the generation of heat in an enclosure in order that there be a balance between supply and demand without excessive variation in temperature, a water thermostat on a hot water heating boiler, a pressure switch on a steam or vapor boiler or an air thermostat on a warm air furnace. In the operation of this control circuit when a room is cooled or is warmed to a predetermined degree, the room thermostat may operate to start or to terminate the operation of the heating means. However, either one or all of the controls may operate to control the system, the present invention acting only upon the failure of one or all of the previously mentioned devices to operate in a normal manner.

The construction of the present invention is directed to a pair of coordinated thermally actuated members for operating switching means, one of said switching means controlling a fuel supplying means and the other of said switching means controlling the ignition means therefor. The actuating members operate the switching means by the return of the members to a normal condition after having been normally functioning in an abnormal condition. In order to explain this statement, it will be noted that it has been usual to operate an actuating member to an abnormal position in order to terminate the operation of a heating system, as for example, a thermally operated member may be heated by means of a resistance element connected in the control circuit to actuate a tiltable switch into an open circuit position when undesirable conditions obtain within the heating system.

As further illustrations, a fusible element may be fused to break the electrical circuit of a control system, or, a magnet may be energized to attract an armature, the latter tilting a switch into an open circuit position. It will be particularly noted in the above examples that all of the control members adapted to break the control circuit are actuated into an abnormal position or condition in order to perform their functions. In the present invention, as has been hereinbefore pointed out, the actuating elements return to a normal condition in order to actuate the switching means and thereby to perform their safety functions.

The control circuit referred to may be operated by alternating current or direct current and the particular construction and arrangement of the safety switch permits of its use independent of motor current and frequency.

Other objects and advantages will be apparent from the description and drawings forming a part of this specification to which latter reference may now be had for a more complete understanding of the characteristic features of this invention, in which drawings:

Figure 1 is a diagram showing my invention applied to a conventional type of oil burner and boiler assembly wherein the safety control mechanism P is shown attached to the stack of the boiler and is also shown diagrammatically for the purpose of exhibiting the electrical connections incorporated in my control system;

Fig. 2 is a simplified schematic diagram of the control circuit shown in Fig. 1 wherein the room thermostat A and the boiler switch B are shown in open circuit positions;

Fig. 3 is a schematic diagram showing the circuit conditions obtaining with the room thermostatic switch open, the motor room thermostatic switch A open, the motor C in operation, the motor switch D in closed position and the electric thermal relay or actuator E energized;

Fig. 4 is a schematic diagram showing the conditions that obtain in the circuit with the room thermostat A and the boiler control switch B closed, the motor C operating, the motor switch D in closed position, the electric thermal relay E deenergized but having sufficient residual heat to hold the motor switch D closed and the ignition switch F in closed circuit position;

Fig. 5 is a schematic diagram showing the conditions of the circuit when combustion has been established within the oil burner and when the thermosensitive element of the stack switch has moved to such position as to open the circuit through the ignition switch F and to hold the motor switch D in closed circuit position;

Fig. 6 is a schematic diagram showing the conditions of the circuit that obtain upon failure of combustion and after the residual heat within the thermal relay E has been completely dissipated thus permitting the motor switch D to move automatically to open circuit position thus discontinuing operation of the motor C and establishing what may be termed a "lock-out" condition; and Fig. 7 is a schematic diagram showing the circuit conditions that obtain when the reset switch J of Fig. 6 is moved to open circuit position for the purpose of energizing the thermal relay E whereby the motor switch D may be automatically moved to closed circuit position as shown in Fig. 3;

Fig. 8 is a front elevational view of the device of the present invention in a normal inoperative position with the cover removed;

Fig. 9 is a central vertical sectional view taken on the line 9—9 of Fig. 8;

Fig. 10 is a side elevational view of one of the thermally operated members of the device in a disassembled condition;

Fig. 11 is a front elevational view of the device of Fig. 10;

Fig. 12 is a front elevational view of the operating mechanism of the device of the present invention showing a normal inoperative condition thereof;

Fig. 13 is a view similar to Fig. 12 showing the operating mechanism in a changed position whereby a normal operative condition is obtained; and Fig. 14 is a view similar to Fig. 12 showing the relative positions of the operating mechanism in lock-out condition due to failure of ignition or combustion.

Referring now to the drawings and more particularly to Fig. 1 thereof, a control circuit embodying one form of my invention is illustrated diagrammatically. A line switch I connects the power lines to a junction box M from which point all of the electrical connections are made to the various devices comprised in the system. A room thermostatic switch A, which will be referred to as the temperature control switch, is, of course, disposed in any convenient place, such as a room, the temperature of which is to be controlled and which is heated by the fuel burner whose operation is controlled by my present system. A boiler control switch B is usually a pressure-operated device and subjected to the pressure obtaining in the boiler. This switch may be mounted upon the boiler which is heated by means of the fuel burner, the operation of the latter being, in turn, controlled by a motor C. The boiler switch B may be of any well known type and preferably one in which the electric circuit therethrough is disconnected as soon as the boiler pressure exceeds a certain predetermined maximum safe value and which moves to closed circuit position when the boiler pressure falls below a certain predetermined minimum value. A reset switch J may be any well known type, such as a snap or wall switch. The electric motor C, of course, supplies the fuel to the burner or, if desired, may operate the blower. An ignition spark coil and magnetic gas valve G operate to ignite initially the burner flame and an oil valve H operates simultaneously with the operation of the motor C to open the fuel supply line to the burner.

In the safety control mechanism, the switches F and D, herein shown as electrical contactors or mercury electric contactors, are housed in a casing with an electrically heated actuator E. A resistor K is also supported upon, or may be housed within the casing that houses the switches F and D. The switches F and D are shown in the positions which they occupy respectively when the safety control mechanism is cold. In other words, the switch F is shown as being in closed position indicating that the stack thermostat, to be hereinafter described, is cold. The switch F, in closed position, connects the ignition spark coil or magnetic gas valve G in circuit as soon as the room thermostat A is closed. The motor switch D is shown as being in open circuit position indicating that the electrically heated actuator E, to be hereinafter described, is cold or that the heater element thereof is disconnected from the power supply circuit.

In the specific illustrative example of my invention illustrated in Fig. 1, a conventional type of oil burner having the electric motor C for supplying fuel and air to the burner nozzle is shown as being attached to a conventional type of domestic boiler N. The liquid fuel is supplied to the burner from any source such as a storage tank, not shown, and the independent gas supply, controlled by the device G, may be taken from any suitable source. Since the oil burner and the boiler N are well known in the art further description of these elements is not deemed necessary. The device G for igniting the gas pilot flame may comprise a spark plug O connected to a spark coil housed in the device G. The electrically operated gas valve comprised within the device G is well known in the art.

The stack switch or safety control mechanism P, as will be hereinafter described, comprising the switches F and D, is provided with a thermosensitive element R which is disposed in the stack of the boiler N or in such position that the thermosensitive element R is subjected to combustion conditions obtaining within the combustion chamber of the boiler. The stack switch P comprising the thermosensitive element R is not shown in detail in Figures 1 to 7, inclusive, for the reason that the mechanism P is more fully shown and described in connection with Figures 8 to 14, inclusive.

In order to more fully understand the operation of the control circuit illustrated in Fig. 1, I have shown in Fig. 2 a simplified diagram of this circuit. The boiler control switch B, the room thermostatic switch A, the reset switch J, the motor switch D and the motor C are connected in series with one another across the power supply switch I. The electric heating element of the electrically heated actuator E is connected in shunt to the switches A, B and J. The resistor K is connected in shunt to the switch D. The ignition switch F is connected in series with the ignition spark coil or magnetic gas valve G, this local circuit being in shunt to the motor C. Similarly, the oil valve H is connected in shunt to the motor C. When the temperature of the room or place in which the room thermostat A is disposed is normal this switch is in open circuit position. At the same time the boiler control switch B is in closed circuit position indicating that the pressure obtaining within the boiler is below the predetermined maximum safe value. Of course, it is to be understood that the boiler control switch B may be dispensed with.

When the temperature within the room decreases below the predetermined minimum value, the room thermostat A then moves to closed circuit position thus initiating the operation of the control circuit to cause the fuel burner to generate further heat in order to raise the temperature of the room above the predetermined minimum value.

In Fig. 3 I have shown a schematic diagram of the energized circuit comprising the heating element of the actuator E when the room thermostat is open and when the motor C is not operating. When this condition obtains the electric circuit through the actuator E is connected through the motor switch D and the motor C to the power supply lines. The motor switch D, as will be hereinafter explained, is held normally in closed circuit position by the electrically heated thermostatic actuator E when heated. The current flowing through the circuit of Fig. 3, while sufficient to cause the actuator E to hold the switch D in closed circuit position, is insufficient to permit operation of the motor C although the circuit normally energizing the heating coil of the actuator E is closed through the motor C. The ignition switch F is now also in closed circuit position because the stack switch is cold but, inasmuch as the circuit comprising the switch F and the ignition means G and the circuit comprising the oil valve H are connected in shunt to the motor C which is not now running, the current flowing through these shunt circuits is insufficient to cause the devices G and H to be energized. When the motor C is not running the potential drop thereacross by reason of the current flowing through the heater element of the actuator F is insufficient to energize the devices G and H.

In Fig. 4 the schematic diagram illustrates the conditions that obtain when the room thermostat is closed thus initiating operation of the motor C. The boiler control switch B is in closed circuit position by reason of the fact that the pressure obtaining within the boiler is below a predetermined maximum safe value. When the room thermostat A moves to closed circuit position, current flows in the series circuit comprising the boiler control switch B, the room thermostat switch A, reset switch J, the motor switch D and the motor C. The closing of the room thermostat switch A shunts out the electric heater circuit of the actuator E, as indicated by the dotted lines. As the motor C speeds up, thus initiating operation of the fuel burner, the counter electromotive force developed within the motor C is sufficient to cause an ample supply of current to flow through the shunt circuits comprising the oil valve H and the ignition switch F and the device G. The device G now becomes energized and if favorable conditions obtain within the combustion chamber then combustion is established within the combustion chamber that is fed by the fuel burner. The actuator E, although having its heater element shunted out of circuit as indicated above, retains the motor switch D in closed circuit position for a short time by reason of the residual heat retained by the actuator. The motor switch D is thus mechanically held in closed circuit position by the actuator E for a time interval after the heater circuit of the actuator E has been deenergized as shown in Fig. 4.

Assuming that combustion has been established, then the circuit conditions will be those as shown in Fig. 5 wherein the switch D is shown as being held in closed circuit position. This results from the fact that the bimetallic or thermosensitive element R of the mechanism P has become heated by the burner and, as a result thereof, this element is distorted from its cold position. The thermosensitive element R of the mechanism P performs two functions when it becomes heated as a result of the heat transmitted to it from the combustion obtaining within the combustion chamber. One function of the thermosensitive element R is to hold mechanically the motor switch D in closed circuit position and the second function is to open the circuit comprising the device G by moving the ignition switch F to open circuit position. The operation of the mechanism P comprising the thermosensitive element R is fully explained in connection with Fig. 9. Since the heater element of the thermostatic actuator E has been deenergized, as shown in Fig. 4 and since the residual heat within the actuator E has been completely dissipated, the actuator E has released its hold upon the switch D and, therefore, does not assist in holding the switch D in closed circuit position after the element R has become heated.

In the event that combustion has failed to be established within the combustion chamber after the circuit conditions of Fig. 4 have been initiated, then, in that event, the circuit conditions are those shown in Fig. 6. Herein the boiler control switch B still occupies closed circuit position and similarly the room thermostatic switch A.

The thermosensitive element R of the mechanism P has not been subjected to any increase in temperature and, consequently, it does not affect the normal operation of the motor switch D or the operation of the ignition switch F. The heater circuit of the thermostatically operated actuator E has previously been disconnected from circuit, as shown in Fig. 4, and the residual heat of the actuator has been completely dissipated. Since the thermosensitive element R of the stack switch P has not been distorted from its cold position, the motor switch D then automatically moves to open circuit position, as shown in Fig. 6, because the actuator E has released its hold upon it. Thereupon the resistor K is connected in circuit, the resistor K being connected in shunt to the switch D, and current flows in series through the boiler switch B, the room thermostatic switch A, the reset switch J, the resistor K and the motor C. The resistance value of the resistor K is sufficiently high to prevent operation of the motor C under the conditions that obtain in Fig. 6. The switch D is in open circuit position precluding the operation of the motor C and the fuel burner because of the fact that the thermostatic actuator E is now completely deenergized and devoid of its residual heat. When the conditions of Fig. 6 obtain, the operator is then fully advised of the fact that the burner has failed to ignite and that combustion has not been established within the combustion chamber. Of course, it is obvious that the resistor K might be constituted by an incandescent lamp or other suitable alarm thus giving a visual signal to the operator notifying him that combustion has not been established.

After the trouble, as indicated in Fig. 6, has been removed, which may have been the result of clogged fuel supply lines or of faulty spark plugs associated with the ignition device G or any other defect within the system, the operator is then required to place the control circuit in normal condition so that the fuel burner may be automatically started and stopped by the room thermostat A. In order to restore the circuit of Fig. 6 to normal condition, as shown in Fig. 3, it is first necessary to reset the motor switch D to its normal closed circuit position. To accomplish this end, the reset switch J of Fig. 2, which is normally closed, is moved to open circuit position, thus completely deenergizing the circuit comprising the boiler control switch B and the room thermostatic switch A. Thereupon the circuit of Fig. 7 is established and the heater element of the thermostatic actuator E is connected in series circuit with the resistor K and the motor C across the supply lines. The resistance values of the elements G and K are sufficient to preclude operation of the motor C but the current flowing through this circuit suffices to heat the thermostatic actuator E whereupon the motor switch D is then automatically moved to closed circuit position. Thereupon the circuit conditions are those as illustrated in Fig. 3. The relation of the resistance value of the resistor K to the resistance value of the heater element of the thermostatic actuator E, is such that when the circuit conditions of Fig. 6 and Fig. 7 obtain the motor C will not be supplied with sufficient current to operate it. However, the resistance values of these two elements K and G must be so proportioned that the actuator E will be furnished with sufficient heat, electrically developed, to move the motor switch D to closed position, as shown in Fig. 3, when the reset switch J is opened.

Assuming that the circuit assumes the conditions as shown in Fig. 5 which obtain when combustion has been established and the fuel burner is operating normally. If the fuel supply to the burner is discontinued for any reason, the thermosensitive element R of the stack switch P will cool off by reason of the fact that combustion has discontinued. In this event, the element R releases its hold upon the motor switch D and the motor switch D will then move automatically to open circuit position and the circuit conditions shown in Fig. 6 will be established. Thereupon the motor C will discontinue operation thus precluding the fuel from being fed to the burner when combustion has been discontinued after having been initiated.

When failure of combustion obtains, as shown by the circuit conditions of Fig. 6, the shutting down of the motor C invites inspection of the burner and the fact that the motor C is automatically disconnnected from the circuit by the motor switch D moving to open circuit position precludes the gradual accumulation of oil in the furnace and a possible explosion when the mixture becomes enriched or the pilot light suddenly ignites the accumulated fuel. If the burner is functioning normally and the fuel supply to the burner becomes exhausted, then combustion, of course, will cease. Thereupon, the thermosensitive element R of the stack switch P will cool and assume its normal cold position. At this time the motor switch D will then automatically move to open circuit position thus discontinuing operation of the motor C.

Referring now more particularly to Figs. 8 to 14, inclusive, the device P will now be more fully described. This safety switch comprises a casing for housing the operating mechanism including a mounting plate 15 preferably formed of sheet metal and a cover 16 of a similar material and suitably mounted thereon and secured thereto by screws 17 extending into posts 18, the latter being in turn mounted on a pair of brackets 19 secured to the mounting plate 15. A projection 20 fixedly secured to the mounting plate 15 on the rear side thereof is adapted to receive and to support a horizontally extending tube 21, the latter being secured by means of a set screw 22 to the projection 20. The tube 21 extends through an aperture in a stack or is so positioned as to have direct communication with the products of combustion. A flanged collar 23, extending about the tube 21, may be secured to the stack or to a portion of the furnace or boiler in order to secure the safety switch relative thereto.

The projection 20 has an aperture therethrough in which is journalled a rod 24 which latter extends from within the casing through the tube 21 to a substantial distance beyond the end thereof. The outer end of the rod 24 is bent at right angles and threaded to receive a lock nut and nut 25 between which nuts is secured one end of a helical bimetallic element 26, the other end of the element 26 being fixedly secured to the outer end of the tube 21 by means of screw 27. An actuating member 28 is loosely mounted on the other end of the rod 24 within the casing 16.

The actuating member 28 is held in frictional engagement with the rod 24 by means of a compression spring 29 disposed between lock nuts 30 and the member 28, the latter in turn bearing against lock nuts 31. By reason of the lock nuts 30 and 31 having a fixed engagement with the shaft 24, the spring 29, exerting a pressure against the actuating member 28, frictionally holds the latter against relative motion with the lock nuts.

A tiltable liquid contactor 32 is mounted on the upper end of the actuating member 28, the contactor 32 being preferably of the usual type comprising a sealed container having a pair of spaced cooperating electrodes disposed therein adjacent one end thereof and a body of current conducting fluid, such as mercury, likewise disposed therein for bridging the electrodes to form an electrical circuit when the contactor is tilted in one direction and to flow away from the electrodes to interrupt the circuit through the contactor when the latter is tilted in an opposite direction. The contactor 32 is mounted in a suitable clip 33 which latter is fixedly secured to the actuating member 28 as by means of the eyelet 34.

Directly below the actuating member 28 is a tube supporting member 35 preferably formed of a substantially inverted U-shape and pivoted on a pin 36 which latter is mounted on the mounting plate 15. The inverted U-shaped supporting member 35 has a horizontally extending projecting portion 37 on the upper end thereof, which engages the actuating member 28, the projection 37 being spaced a substantial distance above the pin 36 and preferably formed integrally and in alignment with the upper end of the member 35.

A contactor tube 38 similar in all respects to contactor tube 32, is mounted in the clip 39 which latter is in turn mounted on the lower end of the inverted U-shape support 35. The tube 38 and tube support 35 are counter-weighted by means of a plate 40 fastened to the lower end of the tube support 35 and secured thereto by means of the screw 41, the latter extending through the clip 39 support 35 and weight 40 and terminating a substantial distance therebeyond.

An arm 42 frictionally engaging and being supported by a collar 43 engages and is actuated by the screw 41. The collar 43 is rotatably mounted on the mounting plate 15, a screw 44 extending through the collar and being fastened on the plate 15. The collar 43 has an annular head 45 against which the arm 42 is urged by a compression spring 46, the latter being in turn held in a compressed relation by means of a washer 47 and a second arm 48 which are mounted on a reduced portion of the collar 43 and held thereon by means of the head of the screw 44. In the operation of this latter described mechanism when the arm 48 is moved in one direction, the collar 43 is moved therewith to in turn move the arm 42. However, should the arm 42 meet with a sufficient resistance a continued movement of the arm 48 and the consequent rotation of the collar 43 would not effect any movement in the arm 42. Stop 42a is provided on the mounting plate 15 to limit the movement of the switch 38 by engaging the support 35 when the bimetallic element 26 is being heated whereby an immediate pickup of the switch 38 to change the circuit connections therethrough is had by a change of direction of movement of the actuator. Stop 28a is provided for engaging actuator 28 for a like purpose with respect to switch 32 when the element 26 is cooling.

The electrically heated actuator E is mounted in the upper end of the casing 16 adjacent the switching mechanism or contactors D and F. By referring now more particularly to Figs. 10 and 11, a detailed description of the element E will now be recited. A heating coil 49 is wound about a preferably rectangularly shaped strip of insulating material 50 suitable for use as a core. A strip of mica 51 is disposed on each side of the core or resistor 50. On the outside of the mica strips 51 are disposed bimetallic members 52 each comprising preferably a strip of invar metal 53 welded or otherwise secured to a strip of brass 54. The materials which have been specifically designated may be replaced by other materials having similar characteristics, that is, unequal expansion or contraction when heated or cooled. The brass elements of the bimetallic members are preferably disposed on the outside side of the actuator in order that when the heating coil is energized, the heat therefrom will expand the actuator in the same manner as heat actuates an expansible and contractible bellows. Ears of material 53 extend beyond the confines of the material 54 and are connected together whereby the two opposed bimetallic members are connected together. These ears may extend from each of the four corners whereafter the center portion of the elements will move apart upon being heated. A projecting member 55 is fixedly fastened preferably midway between the edges and ends to one of the bimetallic elements and has a pin 56 extending at right angles to the axis of the projecting member. The other actuating member has a screw threaded projecting member 57 which engages and is supported by an insulating blank 58, the latter being in turn secured to the mounting plate 15 as by means of screws 59.

An actuating arm 60 is pivotally mounted at one end 61 to the mounting plate 15 and extends downwardly, the lower end thereof being connected by means of a link 62 to the arm 48. Suitable terminal plates 63 and 64 are provided within the casing, terminal blocks 64 being mounted on the brackets 19 and the terminal block 63 being mounted on posts 65.

The reset switch J and the resistor K are mounted on the rear of the mounting plate 15. The switch J may comprise the ordinary wall switch with an operating handle or push button extending through the plate 15 to the forward side thereof outside or below the casing in order to be readily accessible for operation. The resistor K may preferably comprise a sealed tube 63' preferably formed of an insulating material such as glass, hard rubber and the like. The tube 63' may have a reentrant portion 64' about which a resistance coil or wire may be wound, the turns of the coil being insulated from each other and held firmly in such insulated position by means such for example as an asbestos paste which may be spread over the coils and the reentrant portion and may be allowed to dry thereon. As shown in the wiring diagrams particularly, this resistor K is connected in shunt across the switch D.

In the operation of the device thus far described, the actuator E, when heated sufficiently, moves the arm 60 thereby moving the arm 48 in the same direction through link 62.

In moving the arm 48, the collar 43, being secured thereto, is rotated to move the arm 42 in a reverse direction, the arm 42 engaging the screw 41 actuating the contactor 38 to tilt the same to make an electrical circuit therethrough. When the actuator E is cold, it contracts to move the arm 60 in the opposite direction whereby the arm 42 permits the counterweight 40 to tilt the contactor 38 to break the circuit therethrough when there is no combustion in the furnace. The contactor 32 is actuated by means of the helical bimetallic element 26, the heat of combustion tending to operate the bimetallic element to actuate the rod 24. A partial rotation of the rod 24 in one direction will tilt the contactor 32 to make an electrical circuit therethrough and a partial rotation in the opposite direction will tilt the contactor 32 to break the circuit therethrough. Inasmuch as the actuator 28 is operated by the rod 24, the lower end of the actuator 28 will engage the projection 37 to tilt the contactor 38 in a direction to make an electrical circuit therethrough. It will thus be seen that the contactor 38 is operated into an open and closed circuit position either by means of the helical bimetallic element 26 or the electrically heated actuator E.

By referring now more particularly to Figs. 12, 13 and 14, the occasions on which the helical bimetallic element actuator 26 and the electrically heated actuator E operate to cause the change of circuit connections through the switching means F and D will now be described.

Fig. 12 shows the normal inoperative condition of the safety switch, it being noted particularly that the heating element of the actuator E is energized whereby the arm 60 has operated upon the arms 48 and 42 thus holding the contactor 38 in a closed circuit position wherein the mercury bridges the electrodes. The contactor 32 is also in a closed circuit position because there is no combustion in the furnace. It has been previously explained that in this condition the current flowing through actuator E is sufficient to cause the actuator to hold the switch D in a closed circuit position but is insufficient to permit operation of the motor which is in circuit therewith. The electrical circuit wherein the operating mechanism attains this position is shown in Fig. 3.

Assuming that combustion has been established in the furnace or boiler, the switch F or contactor 32 is operated by the helical bimetallic element 26 to an open circuit position. However, at the same time it will be noted by referring to Fig. 4 that the actuator E has been deenergized which ordinarily would permit the arm 60 to move to the right thereby permitting the counterweight 40 to operate the contactor 38 to an open circuit position. However, as before mentioned, the residual heat in the actuator E is sufficient to hold the actuator arm 60 in a position such that an electrical circuit is maintained through the contactor 38 until the helical bimetallic element 26 is heated by the products of combustion to a point where the actuator 28 engages the projection 37 to hold the contactor 38 without the aid of the actuator E which latter thereafter releases its hold as the residual heat becomes dissipated. The electrical circuit in which the operating mechanism attains the position as shown in Fig. 13 is diagrammatically illustrated in Fig. 5.

By referring now to Fig. 14, the operating mechanism has been illustrated in a position such that a proper combustion has not been obtained in the furnace or boiler and therefore the contactor 32 remains in a closed circuit position. We have just seen that the actuator E is shunted out of circuit when the room thermostat and boiler thermostat are in a closed circuit position and therefore the actuator E is deenergized and contracts to permit the counterweight 40 to tilt the contactor 38 to an open circuit position thereby precluding the operation of the motor C and the fuel burner. The electrical circuit in which this position of the operating mechanism is shown may be seen by referring to Fig. 6.

While but a single embodiment of this invention is herein shown and described, it is to be understood that various modifications thereof may be apparent to those skilled in the art without departing from the spirit and scope of this invention, and therefore, the same is to be limited only by the prior art and the scope of the appended claims.

I claim:

1. An electrical control system for an oil burner comprising a temperature control thermostat, a thermostatically controlled actuator, an electric heating element for said actuator the circuit of which is controlled by a circuit comprising said thermostat, a combustion chamber, electrically controlled means for supplying fuel thereto, an electric switch controlling said fuel supplying means, said switch being adapted to be held in a closed circuit position by said actuator when heated, safety control means for controlling said electric switch, said electric switch being maintained by said safety control means in a closed circuit position as long as combustion obtains but permitted to move automatically into an open circuit position upon failure of combustion, and a reset switch connected in circuit-controlling relation to said electric heating element and manually operable to reenergize said element after opening of said controlling switch due to failure of combustion.

2. An electrical control system for an oil burner comprising a temperature control thermostat, a thermostatically controlled actuator, an electric heating element for said actuator the circuit of which is controlled by a circuit comprising said thermostat, a combustion chamber, electrically controlled means for supplying fuel thereto, an electric switch controlling said fuel supplying means, said electric switch being controlled by said actuator, safety control means comprising a thermosensitive element influenced by combustion conditions obtaining in said combustion chamber and controlling said electric switch, said electric switch being maintained by said safety control means in a closed circuit position as long as combustion obtains but permitted to move automatically into an open circuit position upon failure of combustion, and a reset switch connected in circuit-controlling relation to said electric heating element and manually operable to reenergize said element after opening of said controlling switch due to failure of combustion.

3. A fuel burning device comprising a combustion chamber, means for supplying a fuel mixture into a zone of ignition therein, and an electrical control mechanism for preventing the continuous supply of the fuel mixture upon initial failure of combustion or failure of combustion after being initiated, said control mechanism comprising a thermostatic actuator, on electric heating element for said actuator, an electric switch controlling said fuel supply means and adapted to be held in a closed circuit position by said actuator when heated, a thermostatic device responsive to temperature conditions obtaining in said combustion chamber for causing said switch to remain closed when combustion obtains but permitting said switch to open upon failure of combustion, thereby precluding continuous operation of said fuel supply means, and a reset switch connected in circuit-controlling relation to said electric heating element and manually operable to reenergize said element after opening of said controlling switch due to failure of combustion.

4. In a control system for a fuel burning device comprising a combustion chamber, and electrically controlled means for supplying a fuel mixture into a zone of ignition therein, the combination with a temperature control thermostat, a thermostatically controlled actuator, an electrical heating element for said actuator the circuit of which is controlled by said thermostat, of an electric switch adapted to be held in closed position by said actuator when the latter is heated, said electric switch controlling the operation of said fuel supplying means when said thermostat is closed, a safety control mechanism influenced by the combustion conditions obtaining within said combustion chamber for causing said electric switch to remain in closed position as long as combustion continues but permitting said electric switch to move to open circuit position upon initial failure of combustion or failure of continuous combustion within said combustion chamber, and a reset switch connected in circuit-controlling relation to said electric heating element and manually operable to reenergize said element after opening of said controlling switch due to failure of combustion.

5. In a control system for a fuel burning device comprising a combustion chamber, and electrically controlled means for supplying a fuel mixture into a zone of ignition therein, the combination with a temperature control thermostat, a thermostatically controlled actuator, an electrical heating element for said actuator the circuit of which is controlled by said thermostat, of an electric switch adapted to be held in closed position by said actuator when the latter is heated, said electric switch controlling the operation of said fuel supplying means when said thermostat is closed, a safety control mechanism comprising a thermosensitive element that is influenced by the temperature conditions obtaining within said combustion chamber, said safety control mechanism maintaining said electric switch in closed circuit position as long as combustion continues but permitting said electric switch to move to open circuit position upon failure of combustion within said combustion chamber, and a reset switch connected in circuit-controlling relation to said electric heating element and manually operable to reenergize said element after opening of said controlling switch due to failure of combustion.

6. A fuel burning device comprising a combustion chamber, means for supplying a fuel mixture into a zone of ignition therein, electrical operating means for said fuel supplying means, and an electrically controlled mechanism for preventing the supply of the fuel mixture upon initial failure of ignition or failure of combustion conditions thereafter, said control mechanism comprising a thermostatic actuator, an electrical circuit including an electric heating element for said thermostatic actuator for controlling the operation of said electrical operating means, a room thermostatic switch controlling said electric heating element, and electric switch controlling said electrical operating means and which is held in closed circuit position by said electrically heated thermostatic actuator when the latter is heated, a safety control mechanism influenced by combustion conditions obtaining within said combustion chamber for causing said electric switch to remain in closed position as long as combustion conditions obtain within said combustion chamber but permitting said electric twitch to move to open circuit position upon failure of combustion within said combustion chamber, and a reset switch connected in circuit-controlling relation to said electric heating element and manually operable to reenergize said element after opening of said controlling switch due to failure of combustion, said room themostatic switch and said reset switch being connected in series with each other and with said electrical operating means and the circuit of said electric heating element being connected in parallel relation to the circuit of said room thermostatic and reset switches, whereby said heating element is energized by current traversing the same and said electrical operating means in series when either of said switches is open and is short-circuited when both of said switches are closed.

In witness whereof, I have hereunto subscribed my name.

LAWRENCE E. KOCH.